Oct. 13, 1936.    R. G. FERRIS    2,057,627
VENTILATION SYSTEM FOR CATTLE BARNS AND THE LIKE
Filed April 1, 1935    2 Sheets-Sheet 1
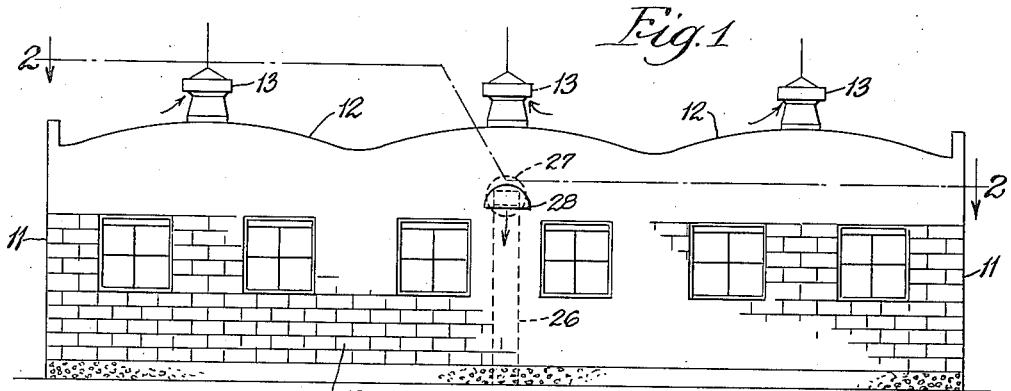
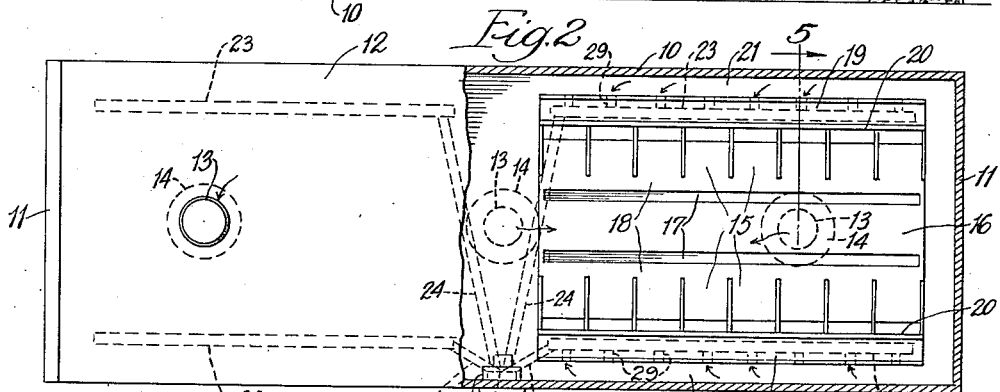
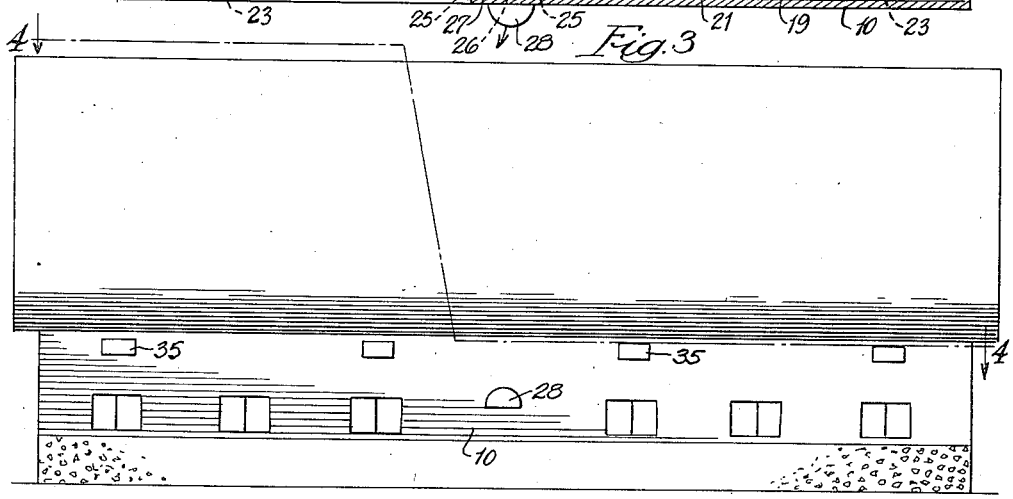
Inventor:
Robert G. Ferris,
By Banning & Banning
Attys.

Oct. 13, 1936.   R. G. FERRIS   2,057,627
VENTILATION SYSTEM FOR CATTLE BARNS AND THE LIKE
Filed April 1, 1935   2 Sheets-Sheet 2
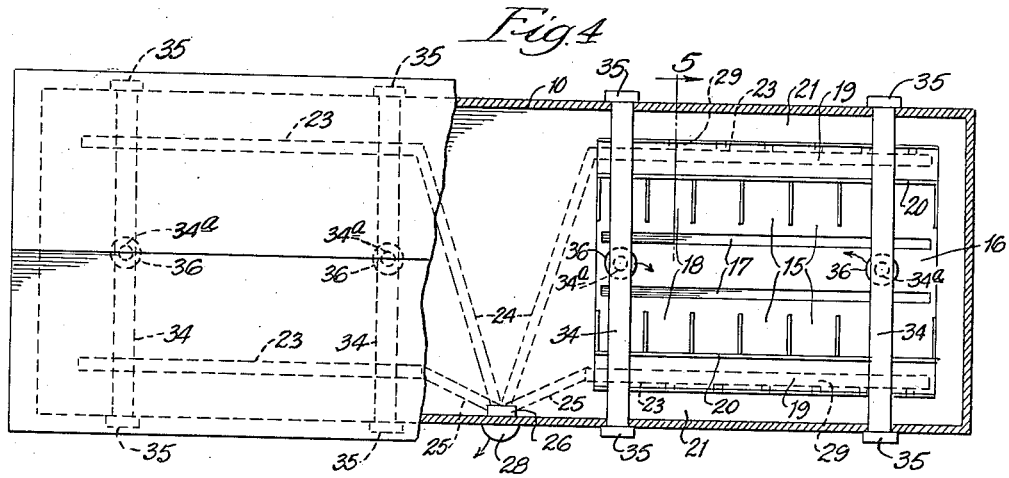
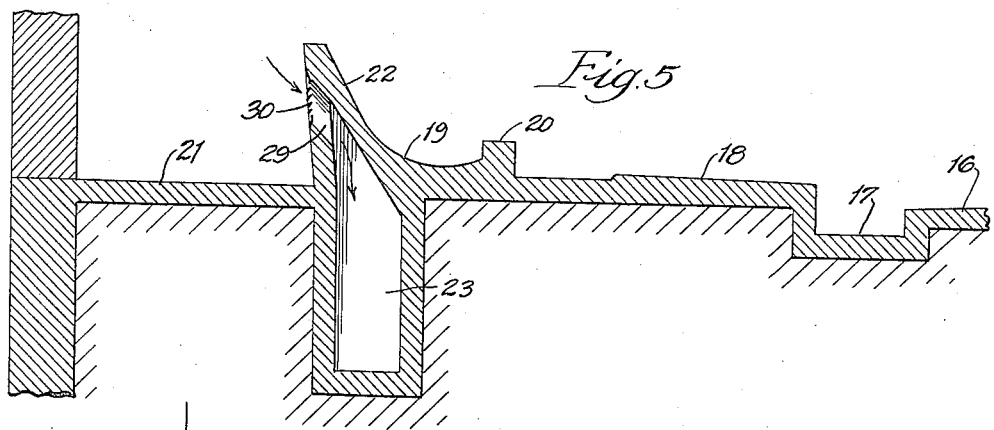
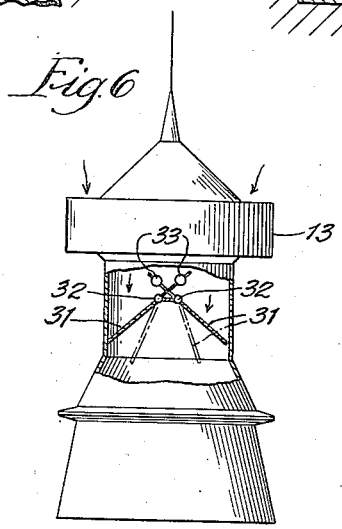
Inventor.
Robert G. Ferris,
By Banning & Banning
Attys.

Patented Oct. 13, 1936

2,057,627

UNITED STATES PATENT OFFICE 2,057,627

VENTILATION SYSTEM FOR CATTLE BARNS AND THE LIKE

Robert G. Ferris, Harvard, Ill., assignor to Starline Inc., Harvard, Ill., a corporation of Illinois Application April 1, 1935, Serial No. 14,110

5 Claims. (Cl. 98—33)

An object of this invention is to provide an improved system of ventilation for cattle barns and the like.

Another object is to provide a ventilation system having means for preventing condensation of moisture on the walls of the outlet passages.

These and other objects, as will hereinafter appear, are accomplished by this invention which is fully described in the following specification and shown in the accompanying drawings, in which—

Figure 1 is a side elevation of a one story cattle barn embodying one form of the invention;

Fig. 2 is a top plan view of the same with a portion of the roof removed to show the arrangement of cattle stalls, and the air ducts forming part of the system as viewed on the broken line 2—2 of Fig. 1;

Fig. 3 is a side elevation of a cattle barn with hay loft embodying a modified form of the invention;

Fig. 4 is a top plan view of the same embodying part of the roof and hay loft broken away as viewed on the broken line 4—4 of Fig. 3;

Fig. 5 is a partial enlarged section on the line 5 of Figs. 2 and 4 showing a cross section of the side wall of the barn together with the stall floor, manger and air passage beneath the manger; and Fig. 6 is an enlarged side elevation of a ventilator including a means to prevent the upflow of air therethrough.

The embodiment shown in Figs. 1 and 2 comprises a cattle barn having side walls 10, end walls 11, and a roof 12 in which is located one or more ventilators 13. These ventilators are shown in detail in Fig. 6 and will later be described. In general, the purpose of these ventilators is just the reverse of that of ventilators which are commonly used in this position; that is, these ventilators are intended to provide means for the introduction of air into the barn at these points instead of for the withdrawal of air. For this reason a spreader plate 14 is provided within the barn and placed a short distance below the opening of each ventilator so as to diffuse air coming into the building at this point, so that it will not descend in a solid stream but instead will be broken up and diffused over a relatively large area. By employing a plurality of such ventilators the fresh air is introduced along a line drawn longitudinally through the middle of the building.

The cattle stalls 15 (Fig. 2) are preferably arranged in two parallel rows longitudinally of the barn facing the side walls, and are provided with a central runway 16, at each side of which is a gutter 17 and beyond this a stall floor 18, and a manger 19, preferably separated therefrom by a curb 20. An outer runway or aisle 21 is preferably provided between the manger and the side wall of the building. The manger is slightly elevated and provided with an outer sloping wall 22, and beneath this manger is constructed an air passage 23 which preferably runs the length of each tier of cattle stalls, as shown in Figs. 2 and 4. Each of these passages connects through a duct 24, 25 with a suitable means for withdrawing air, such as a vertical riser 26, which connects with a power driven fan 27 which draws the air through the riser and forces it out through an opening in the side wall, where it issues beneath a hood 28. Thus a syphon head might be used, if desired, in place of the fan. Air is admitted to the air passage 23, through a series of openings 29 (Figs. 4 and 5) which are shielded by protecting louvers 30. These freely admit air but prevent feed and debris of all kinds from getting into the air passage.

It will be understood from the foregoing that the cold outside air is thus introduced into the barn at a number of points along a median line between the rows of cattle stalls, and that this air then flows through the stalls, over the manger and passes through the openings 29 into the air passage 23, and thence through the ducts 24, 25 and the riser 26 to the outside of the building. By placing the openings 29 and the passages 23 well inside the barn, they are at barn temperature which is well above that of the side walls of the barn, so that condensation of moisture from the outgoing air does not take place upon the walls of the air passage. At the same time the air is withdrawn from points closely adjacent the noses of the cattle, so that the air exhaled by them is very rapidly withdrawn, thereby lessening the chance of spread of certain contagious diseases through the herd of cattle occupying the barn.

It is desired that incoming air shall be introduced through the ventilators 13, as shown in Fig. 6, but that warm air from the barn shall not pass up through this ventilator during the cold winter months. To prevent this I have provided the ventilator 13 with check valves 31 which are hingedly mounted on pivots 32, and provided with counterweights 33 so that when properly balanced they move very readily, the counterweights being so adjusted as to tend to maintain these valves in a closed position, such as shown in full lines in Fig. 6. Any withdrawal of air from the barn, however, by means of the ventilating fan or other air exhausting means will cause these valves to open to admit fresh air. It will also be noted that the fresh air enters near the top of the room in which the cattle are housed and leaves from a plurality of points near the floor of the room.

In Figs. 3 and 4 is shown a modified form of the invention as applied to a barn having a hay loft. In this case it may not be convenient to use a ventilator such as that shown in Fig. 6 because this ventilator would have to be connected through a large vertical pipe with the cattle room below, and such a series of pipes might interfere very greatly with hay carriers and the like which are commonly used for conveying hay into the hay loft. In order to utilize this invention in a barn having such a hay loft, I have provided a plurality of horizontal air ducts 34 which are preferably located between joists forming the floor of the hay loft. These air pipes pass through the building from side to side so as to receive air from both sides, and are preferably provided with suitable hooded air inlets 35 so that air can pass freely through the ducts from one side to the other, the direction of motion of the air depending upon the direction and velocity of the wind. Each pipe is provided near its center with an orifice 34ª through which air is supplied to the barn substantially on a median line between the lines of stalls in much the same way as that previously described for the roof ventilators. Diffusion plates 36 are likewise placed beneath the orifice 34ª.

Thus air is introduced into the center of the barn from a point of substantially neutral air pressure, regardless of the direction or velocity of the wind, because the air ducts connect both sides of the barn and hence one end is often under a positive pressure, while the other is at a negative pressure. Any tendency for air to flow from one side to the other of the barn is neutralized by the hoods at the ends of these ducts.

In warm weather I reverse the system by opening windows and introducing air through them and utilizing the central ventilators and ducts to withdraw air. In that case the valve blades 31 would be held open.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:
1. A barn having a floor on which is located a row of animal stalls with a row of mangers along one side and gutters along the other, an air passage beneath the mangers and having openings near the mangers into the passage, means for exhausting air from the passage and for delivering it outside the building, and means for delivering air inside the building to points above the gutter.

2. A barn having a floor on which are located two rows of animal stalls having mangers and facing the side walls, means for introducing air to the barn adjacent the center thereof and between the rows of stalls, and means for withdrawing air from the barn from points laterally spaced from the side walls of the barn and adjacent the stall mangers to prevent condensation of moisture on said means and for delivering the air outside the barn.

3. A barn having a floor on which are located two rows of animal stalls facing the side walls, means for introducing air to the barn at the center and between the rows of stalls, mangers at the outside of each row of stalls, a runway between the mangers and the adjacent side wall of the barn, an air passage extending longitudinally beneath a row of the mangers, a plurality of openings into the air passage, and means for withdrawing air from the barn through the openings and passage and for delivering it outside the barn.

4. A barn having a floor on which is located a row of animal stalls with a row of mangers along one side and gutters along the other, an air passage beneath the mangers and having openings near the mangers into the passage, means for exhausting air from the passage and for delivering it outside the building, means for delivering air inside the building to points adjacent the gutter, and means to prevent a counterflow of air through the air delivery means.

5. A barn having a floor on which are located two rows of animal stalls each having a row of mangers along one side, an air passage extending longitudinally of the barn in laterally spaced relation to the side walls of the barn and adjacent each row of mangers to prevent condensation of moisture in said passage, a plurality of openings into each air passage, means for exhausting air from the air passages and for delivering it outside the barn, and means for introducing the air into the barn adjacent the center thereof.

ROBERT G. FERRIS.